US012362469B2

(12) United States Patent
Chen

(10) Patent No.: US 12,362,469 B2
(45) Date of Patent: Jul. 15, 2025

(54) ANTENNA DEVICE

(71) Applicant: PanelSemi Corporation, New Taipei (TW)

(72) Inventor: Hsien-Te Chen, Taipei (TW)

(73) Assignee: PANELSEMI CORPORATION, New Taipei (TW)

( * ) Notice: Subject to any disclaimer, the term of this patent is extended or adjusted under 35 U.S.C. 154(b) by 210 days.

(21) Appl. No.: 18/340,124

(22) Filed: Jun. 23, 2023

(65) Prior Publication Data

US 2023/0420832 A1 Dec. 28, 2023

(30) Foreign Application Priority Data

Jun. 24, 2022 (TW) ................................. 111123737

(51) Int. Cl.
*H01Q 1/38* (2006.01)

(52) U.S. Cl.
CPC .................................... *H01Q 1/38* (2013.01)

(58) Field of Classification Search
CPC ...... H01Q 1/38; H01Q 9/0414; H01Q 9/0457; H01Q 21/065; H01Q 1/2283
See application file for complete search history.

(56) References Cited

U.S. PATENT DOCUMENTS

2019/0319349 A1* 10/2019 Loeher ................. H01Q 9/0407
2020/0328167 A1* 10/2020 Chang Chien ........... H01Q 1/38
2024/0022004 A1* 1/2024 Sakurai ................ H01Q 19/021

* cited by examiner

*Primary Examiner* — Renan Luque
(74) *Attorney, Agent, or Firm* — Muncy, Geissler, Olds & Lowe, P.C

(57) ABSTRACT

An antenna device includes a first substrate, plural antenna elements, a second substrate, plural circuit units, plural circuit patterned layers and plural conductive structures. The first substrate is defined with a first surface and a second surface opposite to each other. The antenna elements are arranged on the first surface of the first substrate. The second substrate is connected to the second surface of the first substrate. The circuit units are arranged at the second substrate. The circuit patterned layers are arranged on the first substrate and the second substrate. The conductive structures are connected to at least ones of the circuit patterned layers. One of the circuit patterned layers includes plural induction units corresponding to the antenna elements, at least ones of the circuit units correspond to the induction units, and the induction units and the antenna elements transmit a carrier signal to each other by electromagnetic induction.

10 Claims, 5 Drawing Sheets

ANTENNA DEVICE

CROSS REFERENCE TO RELATED APPLICATIONS

This Non-provisional application claims priority under 35 U.S.C. § 119(a) on Patent Application No(s). 111123737 filed in Taiwan, Republic of China on Jun. 24, 2022, the entire contents of which are hereby incorporated by reference.

BACKGROUND

Technology Field

The present disclosure relates to an antenna device and, in particular, to a new model of an antenna device.

Description of Related Art

As the improvement of communication technology, the applications of communication technology in technology products have been increasing, thereby making related communication products more diversified. Particularly, in recent years, the consumer's requirements for the functions of communication products have become higher, so many communication products with different designs and functions have been continuously proposed. Particularly, electronic products with wireless communication function are a hot trend nowadays. In addition, the technology of integrated circuit is more and more mature, which makes the size of electronic products tends to be lighter, thinner and smaller.

In communication products, the antennas used in electronic devices with wireless communication function must have the characteristics of small size, good performance and low cost in order to be widely accepted and affirmed by the markets. Among various kinds of antennas, the patch antenna has the following advantages of: 1. having a planar structure that can be easily integrated with components and circuits; 2. small size, low height, light weight and easy fabrication, so that it is suitable for mass production of printed circuits; and 3. easy to design linear polarization, circular polarization, dual frequency, broadband and other characteristics, so it is becoming more and more common in wireless products.

SUMMARY

One or more exemplary embodiments of this disclosure are to provide an antenna device that can transmit the carrier signal by electromagnetic induction.

An antenna device of one exemplary embodiment includes a first substrate, a plurality of antenna elements, a second substrate, a plurality of circuit units, a plurality of circuit patterned layers, and a plurality of conductive structures. The first substrate is defined with a first surface and a second surface opposite to each other. The antenna elements are arranged on the first surface of the first substrate. The second substrate is connected to the second surface of the first substrate. The circuit units are arranged at the second substrate. The circuit patterned layers are arranged on the first substrate and the second substrate. The conductive structures are connected to at least ones of the circuit patterned layers. One of the circuit patterned layers includes a plurality of induction units corresponding to the antenna elements, and at least ones of the circuit units correspond to the induction units. The induction units and the antenna elements transmit a carrier signal to each other by electromagnetic induction.

In one exemplary embodiment, the circuit units are arranged on a side of the second substrate opposite to the first substrate.

In one exemplary embodiment, the first substrate is a multi-layer substrate structure.

In one exemplary embodiment, the first substrate includes glass, polytetrafluoroethene, ceramic materials, polyphenylene oxide, or a combination of any of the above materials.

In one exemplary embodiment, the second substrate is a single-layer substrate structure.

In one exemplary embodiment, the second substrate is made of polyimide or polyphenylene oxide.

In one exemplary embodiment, at least ones of the circuit units arranged at the second substrate includes active circuits or active components.

In one exemplary embodiment, the circuit units arranged at the second substrate include a plurality of thin-film transistors, and the thin-film transistors are electrically connected to one of the circuit patterned layers arranged on the second substrate.

In one exemplary embodiment, ones of the circuit patterned layers are arranged on the second substrate, and a plurality of insulation layer are arranged between the circuit patterned layers.

In one exemplary embodiment, the carrier signal defines a carrier frequency, and the carrier frequency is not less than 10 GHz.

In one exemplary embodiment, each of the conductive structures defines a hole and comprises a conductive member arranged in the hole.

In one exemplary embodiment, an adhesive layer is provided between the first substrate and the second substrate for adhering the first substrate and the second substrate.

As mentioned above, in the antenna device of this disclosure, the antenna elements are arranged on the first surface of the first substrate, the circuit units are arranged at one side of the second substrate opposite to the first substrate, the circuit patterned layers are arranged on the first substrate and the second substrate, and the conductive structures are connected to at least ones of the circuit patterned layers. The induction units of one circuit patterned layer and the antenna elements can transmit a carrier signal to each other by electromagnetic induction. Compared with the conventional antenna devices, this disclosure implements a new model of antenna device that can transmit the carrier signal by electromagnetic induction.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements. The drawings of the following embodiments only illustrate the relative relationship between elements or units, and do not represent the actual size or proportion of the elements or units.

The antenna device of this disclosure can be an active matrix (AM) or passive matrix (PM) antenna device, and this disclosure is not limited. The antenna device in the following embodiments is, for example, a phased array antenna device.

Figure 1:
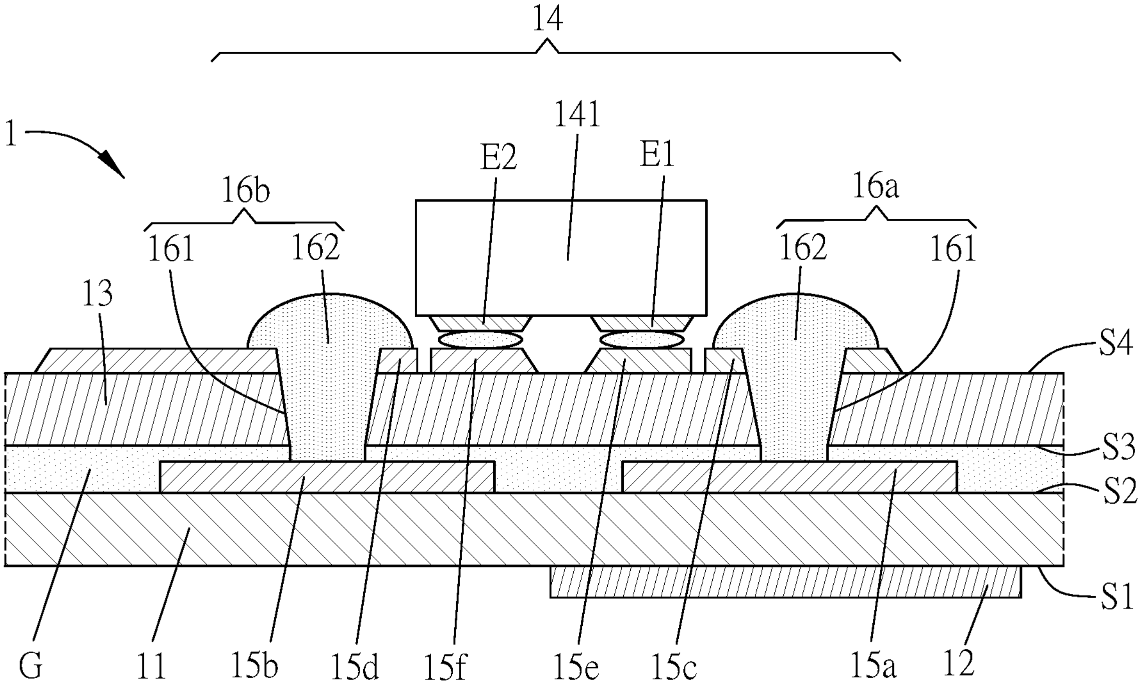
FIG. 1 is a schematic diagram showing an antenna device according to an embodiment of this disclosure.
Figure 2:
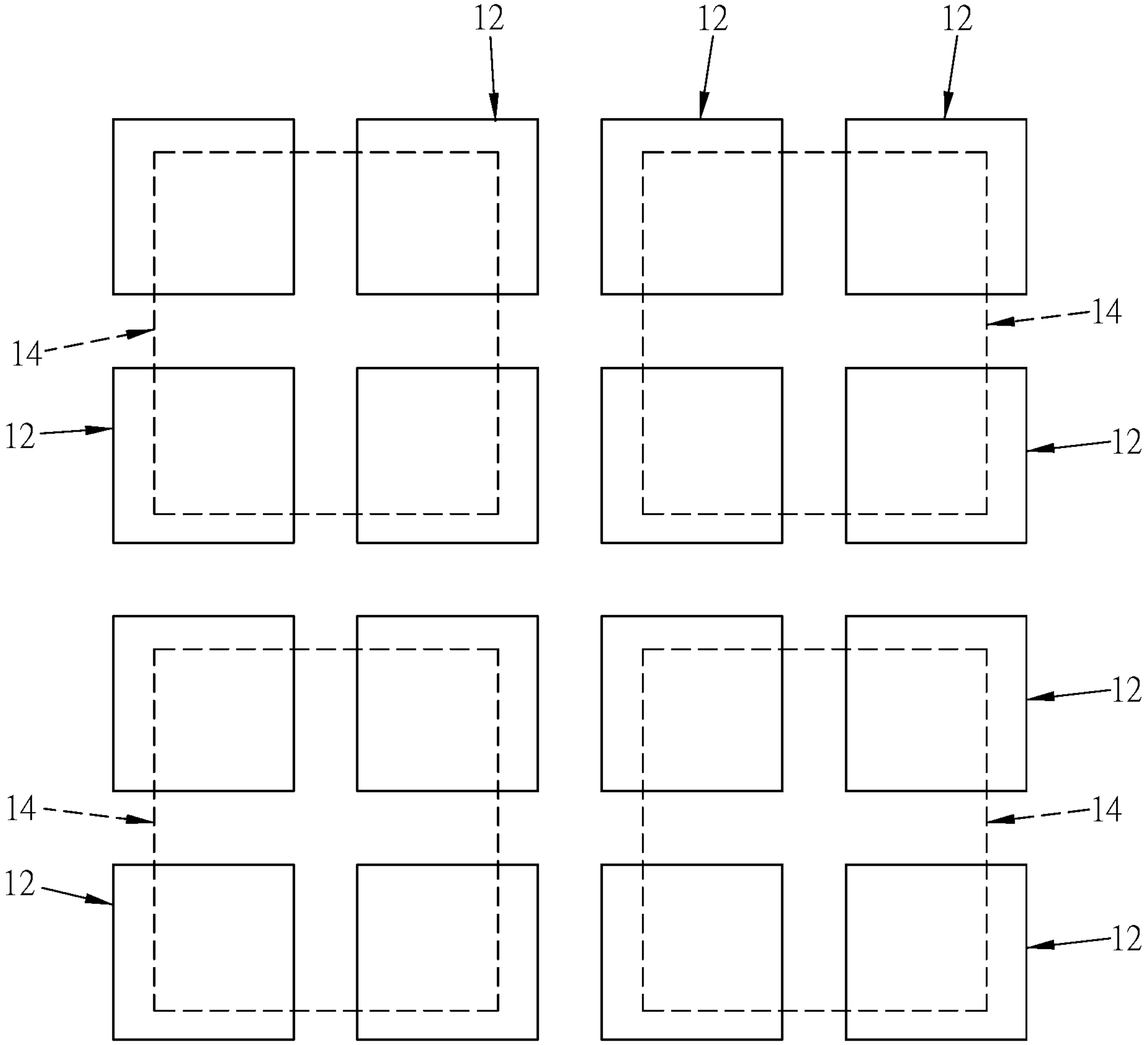
FIG. 2 is a schematic diagram showing an antenna device according to an embodiment of this disclosure, wherein one circuit unit corresponds to multiple antenna elements.

FIG. 1 is a schematic diagram showing an antenna device according to an embodiment of this disclosure. FIG. 2 is a schematic diagram showing an antenna device according to an embodiment of this disclosure, wherein one circuit unit corresponds to multiple antenna elements.

Referring to FIG. 1, the antenna device 1 of this embodiment includes a first substrate 11, a plurality of antenna elements 12 arranged at one surface of the first substrate 11, a second substrate 13 connected to the other surface of the first substrate 11, a plurality of circuit units 14 arranged at the second substrate 13, a plurality of circuit patterned layers 15*a*-15*f* arranged on the first substrate 11 and the second substrate 13, and a plurality of conductive structures 16*a* and 16*b* connected to some circuit patterned layers 15*a*-15*d*. In this embodiment, FIG. 1 only shows one circuit unit 14 and one antenna element 12 for an example.

The first substrate 11 is defined with a first surface S1 and a second surface S2 opposite to each other. In this embodiment, the first surface S1 is the bottom surface of the first substrate 11, and the second surface S2 is the top surface of the first substrate 11. The first substrate 11 can be a single-layer substrate structure, a multi-layer substrate structure, or a combination of multiple heterogeneous substrates. In addition, the first substrate 11 can be a resilient board, a rigid board or a composite board including resilient and rigid boards, and the material thereof can include glass, polytetrafluoroethene (PTFE), ceramics, polyphenylene oxide (PPO) or polyphenylene ether (PPE), or a composite material containing any of the above-mentioned materials. To be noted, the hardness of the board is relative to the resilient board. In this embodiment, the first substrate 11 is, for example, a single-layer substrate structure made of glass, or a single-layer substrate structure made of PTFE and ceramics.

The plurality of antenna elements 12 are disposed on the first surface S1 of the first substrate 11. In this embodiment, the antenna elements 12 can be defined by a plurality of antenna units contained in the metal patterned layer, and arranged on the first surface S1 of the first substrate 11 in, for example, a one-dimensional or two-dimensional array arrangement.

The second substrate 13 is stacked on and connected to the second surface S2 of the first substrate 11. In this embodiment, the second substrate 13 is defined with a third surface S3 and a fourth surface S4 opposite to each other. In this embodiment, the third surface S3 of the second substrate 13 is connected to the second surface S2 of the first substrate 11 by, for example but not limited to, adhesive, and the second substrate 13 is parallel to the first substrate 11. Specifically, an adhesive layer G is provided between the first substrate 11 and the second substrate 13 for bonding the first substrate 11 and the second substrate 13 to each other. The adhesive layer G can be laid continuously (e.g. continuously laid along a plane) or discontinuously (e.g. laid intermittently along a plane, or laid in an area that does not interfere with the functions of other components). The adhesive layer G is an insulating adhesive, and its material is not limited, such as for example but not limited to, optical clear adhesive (OCA), optical clear resin (OCR), polyimide (PI), or the likes. The second substrate 13 can be a single-layer substrate structure, a multi-layer substrate structure, or a combination of multiple heterogeneous substrates. The second substrate 13 can be a rigid board (rigid substrate), a resilient board (resilient substrate) or a combination of rigid board and flex board. To be noted, the hardness of the board is relative to the resilient board. For example, the second substrate 13 can be a glass substrate, a polytetrafluoroethylene (PTFE) substrate, a ceramic substrate, a polyimide (PI) substrate, a polyphenylene oxide (PPO) substrate, or a substrate made of a composite material including at least one of the above-mentioned materials. The second substrate 13 in this embodiment is a single-layer substrate structure, and is, for example, a polyimide (PI) substrate.

The circuit patterned layers are arranged on the first substrate 11 and the second substrate 13. Each circuit patterned layer can include a conductive layer for transmitting electrical signals. As shown in FIG. 1, the number of circuit patterned layers is multiple. In this embodiment, six circuit patterned layers 15*a*, 15*b*, 15*c*, 15*d*, and 15*f* are provided, wherein the circuit patterned layers 15*a* and 15*b* are arranged between the first substrate 11 and the second substrate 13 and located on the second surface S2 of the first substrate 11, and the circuit patterned layers 15*c*, 15*d*, and 15*f* are arranged on the fourth surface S4 of the second substrate 13. In this case, the circuit patterned layers 15*b* and 15*d* are grounding layers and can be electrically connected to the ground terminal, and the circuit patterned layers 15*a*, 15*c*, and 15*f* can be an electrical layer for transmitting electrical signals. The material of each of the circuit patterned layers 15*a*, 15*b*, 15*c*, 15*d*, 15*e* and 15*f* can individually include gold, copper or aluminum, or any combination thereof, or an alloy of any combination thereof, or any of other conductive metal materials. This disclosure is not limited thereto. In addition, the circuit patterned layer 15*a* can include a plurality of induction units contained in the metal patterned layer and arranged in an arrangement manner corresponding to the antenna elements 12.

In some embodiment, the functions of the circuit patterned layers 15*b*, 15*c*, 15*e* and 15*f* may include a power distribution network (PDN) for transmitting and distributing antenna signals, grounding, phase shifter, signal transmission lines, power transmission lines, etc., and this disclosure is not limited thereto. In other cases, the functions such as power distribution network, grounding, phase shifter, signal transmission line and power transmission line can partially or at least partially exist in the same circuit patterned layer.

The conductive structures 16*a* and 16*b* are respectively connected to the circuit patterned layers 15*a*, 15*b*, 15*c* and 15*d*. The number of conductive structures shown in FIG. 1 is two (i.e., the conductive structures 16*a* and 16*b*). In this case, the conductive structure 16*a* is connected to the circuit patterned layer (induction unit) and the circuit patterned layer 15*c*, and the conductive structure 16*b* is connected to the circuit patterned layers 15*b* and 15*d*. The conductive structure 16*a* and the corresponding antenna element 12 are, for example but not limited to be, overlapped along the direction perpendicular to the first substrate 11. In this embodiment, each of the conductive structures 16*a* and 16*b* includes a hole 161 and a conductive member 162 arranged in the hole 161. The hole 161 can penetrate the second substrate 13 by, for example but not limited to, a laser process. The conductive member 162 can include, for example, tin, gold, copper, or silver material, or an alloy or eutectic containing any of the above materials, and it can be formed by, for example but not limited to, spraying, coating, printing, plating or etc., followed by the corresponding thermosetting means. In this embodiment, the holes 161 of the conductive structures 16*a* and 16*b* respectively penetrate the second substrate 13 and the adhesive layer G formed between the first substrate 11 and the second substrate 13, and the conductive member 162 can be arranged in the corresponding hole 161 by, for example but not limited to, filling (preferably fully filling), inserting, stuffing and other methods, so as to achieve the above mentioned structure. It can be understood that the conductive structure is provided with holes on the substrate, sub-substrate, adhesive layer, or other functional or non-functional layers, and the conductive members are provided in the holes, so as to achieve the electrical connection between the two circuit patterned layers. In addition, the corresponding relationship between the conductive structures and the circuit units may be that one conductive structure corresponds to one circuit unit (one-to-one relationship), or multiple conductive structures correspond to one circuit unit (many-to-one relationship). This disclosure is not limited thereto.

The circuit units 14 are arranged on the second substrate 13, and may be further located at one side of the second substrate 13 opposite to the first substrate 11. Among the circuit units 14, at least some of the circuit units 14 correspond to the induction units of the circuit patterned layer 15*a*, and the corresponding relationship therebetween may be that one circuit unit 14 corresponds to one circuit patterned layer 15*a* (one-to-one relationship), or one circuit unit 14 corresponds to multiple circuit patterned layers 15*a* (one-to-many relationship). In this case, each circuit unit 14 can be distributed on a single circuit patterned layer, or an assembly of circuits distributed on one or more circuit patterned layers. Here, in at least some of the circuit units 14, each circuit unit 14 can include at least one electronic component 141, and the electronic component 141 is, for example, arranged on the fourth surface S4 of the second substrate 13. In some embodiments, the electronic component 141 may include at least one signal terminal E1 or at least one signal terminal E2. In other embodiments, the electronic component 141 may include one or more signal terminals E1 or/and one or more signal terminals E2, or it may further include a third signal terminal connected to other circuit patterned layers. As shown in FIG. 1, the electronic component 141 includes, for example, one signal terminal E1 and one signal terminal E2. The signal terminals E1 and E2 can be pins or contacts (electrodes) of the electronic component 141 respectively. In some embodiments, the electronic component 141 can be, for example but not limited to, a flip-chip component, and the signal terminal E1 is electrically connected to the circuit patterned layer 15*e* by surface mount technology (SMT), while the signal terminal E2 is electrically connected to the circuit patterned layer 15*f*. To be noted, the circuit patterned layer 15*e* and the circuit patterned layer 15*c* can be either signally communicated or not, and the circuit patterned layer 15*f* and the circuit patterned layer 15*d* can be either in signal communication or not. In this case, the above-mentioned signal communication can be implemented by the conductive structure of this embodiment, but this disclosure is not limited thereto. Herein, the signal terminal E1 and the circuit patterned layer 15*e* can be directly bonded or electrically connected through other metal materials, and the signal terminal E2 and the circuit patterned layer 15*f* can also be directly bonded or electrically connected through other metal materials. The metal materials can include tin, gold, copper, or silver materials, or the alloy or eutectic containing any of the above materials, or any of other conductive metal materials, and this disclosure is not limited thereto. The direct bonding can use high-temperature thermal melting (e.g. laser melting) to form eutectic connections with the circuit patterned layers 15*c* and 15*d* respectively. In some embodiments, the electronic component 141 can be a passive device or an active device. In some embodiments, the electronic component 141 can be an RFIC (radio frequency integrated circuit), such as a silicon RFIC or a non-silicon RFIC (e.g. GaAs MMIC), which is configured to drive the corresponding antenna element 12 to transmit wireless RF signals. In some embodiments, the electronic component 141 can be a passive device, which can be, for example but not limited to, a specialized passive device (e.g. a capacitor or a resistor) or any generalized passive device without the driving function.

If the electronic component 141 is, for example, an active matrix antenna device, in at least some of these circuit units 14, each circuit unit 14 can further include at least one active circuit arranged corresponding to the electronic component 141 (the passive device). For example, the active circuit can include a thin-film transistor for driving the corresponding electronic component 141. In some embodiments, the circuit units 14 can further include a phase shifter, a coupler, or/and the like. To be noted, if the functions of these circuit units 14 are carried out by different circuit patterned layers, a part of the circuit patterned layer can be arranged on the side of the second substrate 13 opposite to the first substrate 11, and the circuit patterned layers are interposed by a plurality of insulation layers and electrically connected by the conductive structures. To be noted, the one or more circuit patterned layers arranged on the first substrate 11 and the one or more circuit layers disposed on the second substrate 13 can be electrically connected to each other by conductive structures. The electrical connection means of the multiple circuit patterned layers in the same substrate is not limited to the conductive structure of this embodiment. In addition, in some embodiments, the second substrate 13 is an active substrate, and the first substrate 11 can be defined, for example but not limited to, a passive substrate driven by the second substrate 13. Therefore, the second substrate 13 can achieve the active function by the above-mentioned active circuit or active device.

In this embodiment, the induction units and the antenna elements of one circuit patterned layer transmit a carrier (RF) signal through electromagnetic induction. Generally speaking, the induction units correspond to the antenna elements in a one-to-one relationship. Specifically, when one of the circuit units 14 is to drive the corresponding antenna element 12 to transmit a wireless carrier signal, the circuit unit 14 can transmit the electrical signal through the circuit patterned layer 15*e* and the corresponding conductive structure 16*a* to the circuit patterned layer (induction unit) 15*a*, and the antenna element 12 can received the carrier signal from the circuit patterned layer (induction unit) 15*a* by electromagnetic induction and then emit this carrier signal. In another case, when the antenna element 12 receives the electrical signal, the circuit patterned layer (induction unit) 15*a* can retrieve the electrical signal by electromagnetic induction and then transmit it to the corresponding circuit unit 14. In some embodiments, the carrier signal can define a carrier frequency, which is not less than 10 GHz. In some embodiments, the carrier frequency is not greater than 30 GHz (i.e., 10 GHz≤carrier frequency≤30 GHz). In some embodiments, the carrier frequency is, for example but not limited to, 12 GHz or 28.8 GHz.

To be understood, the embodiment of FIG. 1 shows that one circuit unit 14 correspondingly drives one antenna element 12 through the circuit patterned layer (induction unit) 15*a*, but this disclosure is not limited thereto. In different embodiments, for example, as shown in FIG. 2, one circuit unit 14 can correspondingly drive multiple (e.g. four) antenna elements 12 through one or more circuit patterned layers (induction units) 15*a*.

Figure 3:
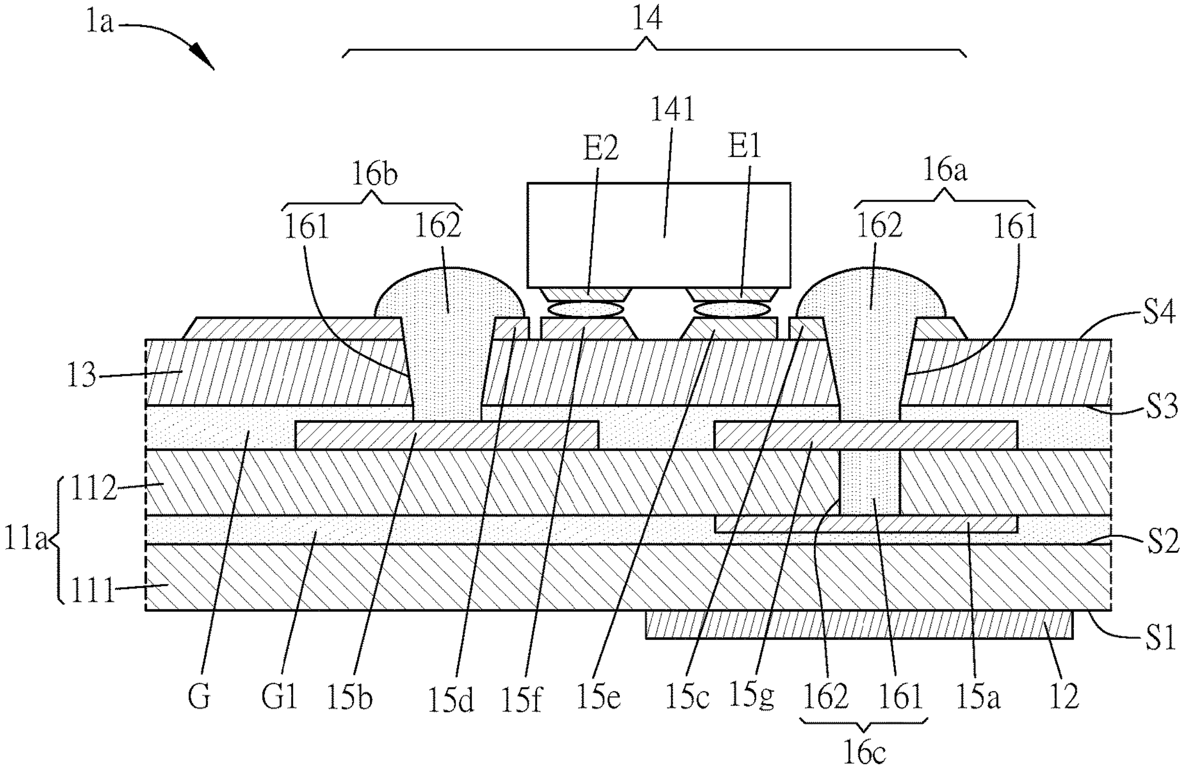
FIGS. 3 to 5 are schematic diagrams showing antenna devices according to different embodiments of this disclosure.
Figure 4:
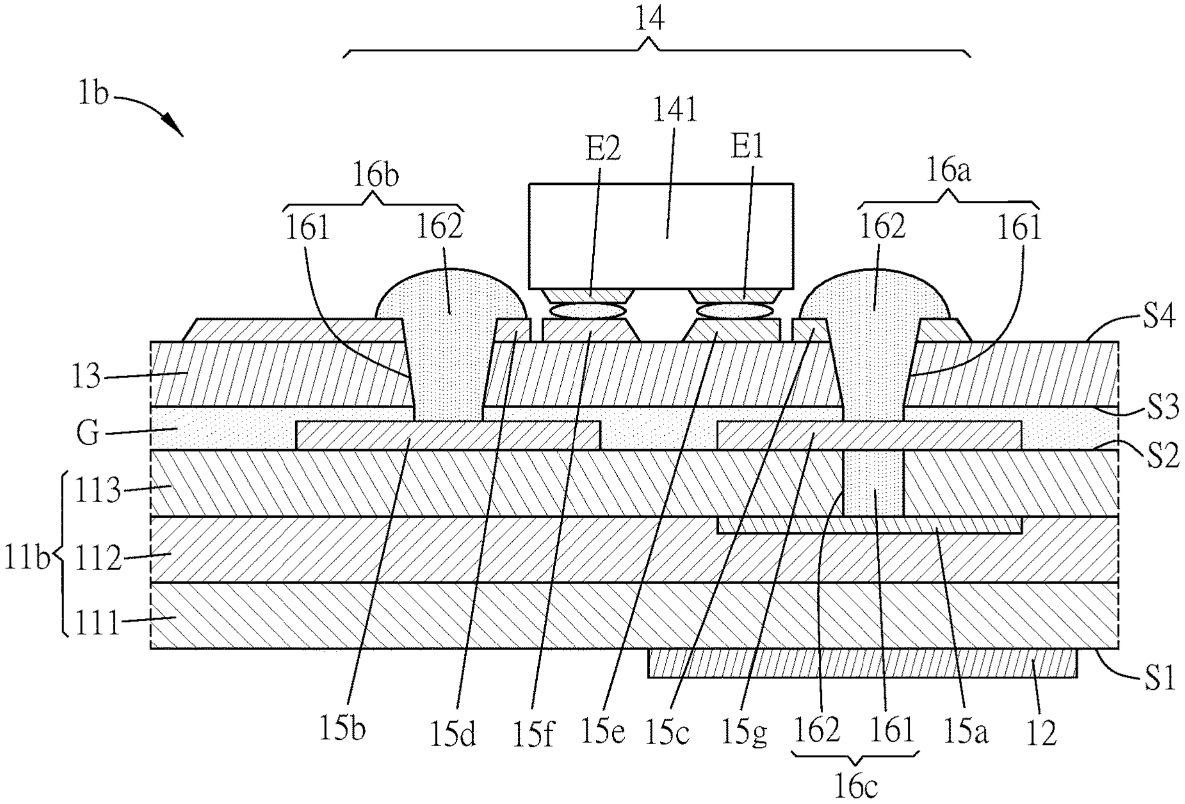
Figure 5:
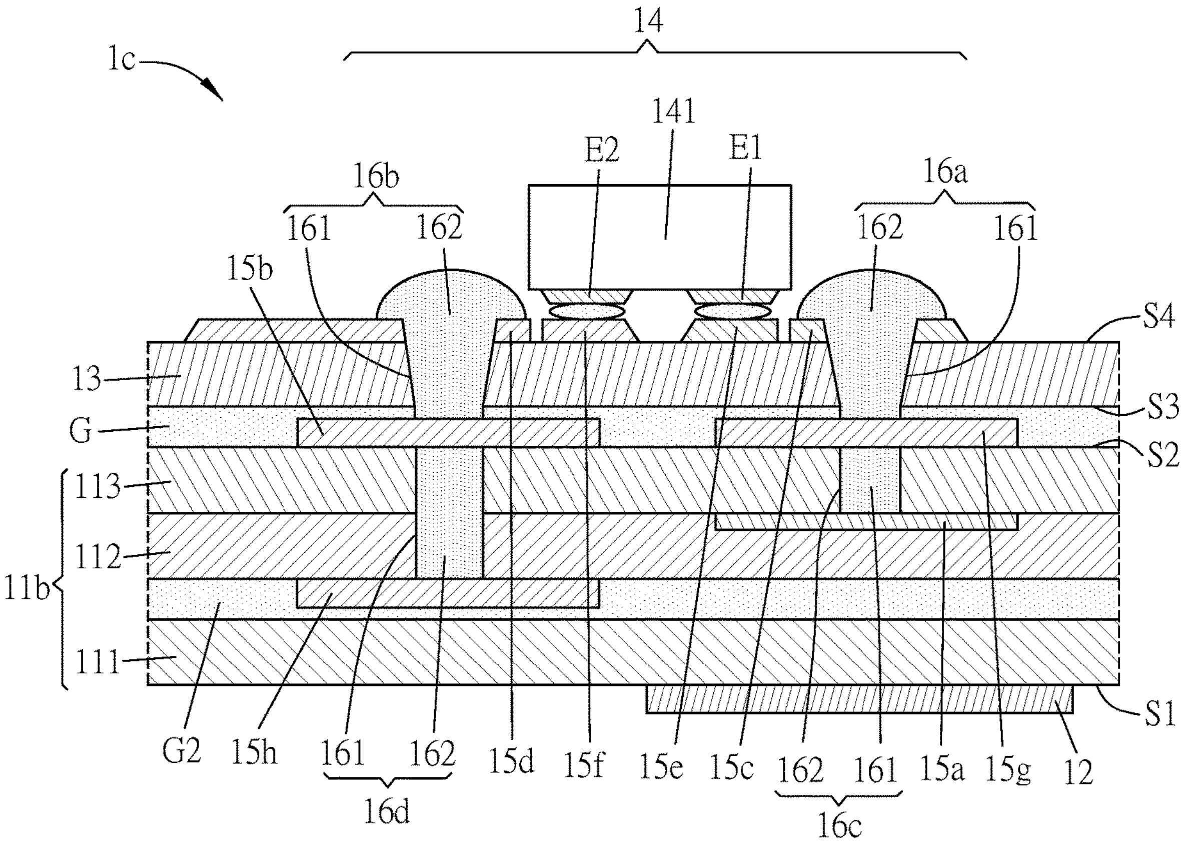

FIGS. 3 to 5 are schematic diagrams showing antenna devices according to different embodiments of this disclosure.

The antenna device 1*a* of this embodiment as shown in FIG. 3 is mostly the same as the antenna device 1 of the previous embodiment. Unlike the above-mentioned antenna device 1, the first substrate 11*a* of the antenna device 1*a* of this embodiment is a multiple-substrate structure, which is composed of two sub-substrates 111 and 112. The sub-substrate 112 is located between the sub-substrate 111 and the second substrate 13. In this embodiment, the sub-substrate 111 can be, for example, a glass substrate, and the sub-substrate 112 can be a PI substrate or a PPO substrate, or a substrate composed of a combination of materials. An adhesive layer G1 is provided between the sub-substrates 111 and 112 so as to form the first substrate 11*a*. The circuit patterned layer 15*a* containing the induction unit is arranged inside the first substrate 11*a*. For example, the circuit patterned layer 15*a* can be arranged on a (lower) face of the sub-substrate 112 away from the circuit patterned layer 15*g*, and is located between the sub-substrate 111 and the sub-substrate 112.

In the first substrate 11*a*, the electrical connection between the circuit patterned layer 15*g* and the circuit patterned layer (induction unit) 15*a* can be implemented by another conductive structure 16*c*. In this case, the conductive structures can be, for example but not limited to be, overlapped along the direction perpendicular to the substrate 11. Therefore, when the circuit unit 14 is to drive the corresponding antenna element 12 to transmit a wireless carrier signal, the circuit unit 14 can transmit the electrical signal to the circuit patterned layer (induction unit) 15*a*, and the antenna element 12 can received the carrier signal from the circuit patterned layer (induction unit) 15*a* by electromagnetic induction and then emit this carrier signal. In some embodiments, the circuit patterned layer (induction unit) 15*a* can be arranged on the sub-substrate 111 and located the side of the sub-substrate 11 that is the same as location of the adhesive layer G1. In some embodiments, more than one sub-substrates 112 can be arranged between the adhesive layers G and G1.

The antenna device 1*b* of this embodiment as shown in FIG. 4 is mostly the same as the antenna device of the previous embodiment. Unlike the above-mentioned antenna device, the first substrate 11*b* of the antenna device 1*b* of this embodiment is a multi-substrate structure composed of three sub-substrates 111, 112 and 113 stacked in sequence. Each of the sub-substrates 111, 112 and 113 can be, for example but not limited to, a PI substrate or a PPO substrate, or a substrate composed of a combination of materials. In this embodiment, the sub-substrates 111, 112 and 113 can be directly bonded. In some embodiments, the sub-substrates 111, 112 and 113 can all be PPO substrates. In addition, the electrical connection of the circuit patterned layer 15*g* and the circuit patterned layer (induction unit) 15*a* can be achieved by the conductive structure 16*c*. Therefore, when the circuit unit 14 is to drive the corresponding antenna element 12 to transmit the wireless carrier signal, the electronic element 141 can transmit the electrical signal to the circuit patterned layer 15*a* through the circuit patterned layer 15*c*, the conductive structure 16*a*, the circuit patterned layer 15*g*, and the conductive structure 16*c*, and the antenna element 12 can received the carrier signal from the circuit patterned layer (induction unit) 15*a* by electromagnetic induction and then emit this carrier signal.

The antenna device 1*c* of this embodiment as shown in FIG. 5 is mostly the same as the antenna device of the previous embodiment. Unlike the above-mentioned antenna device, one of the sub-substrates of the antenna device 1*c* (the sub-substrate 111) of this embodiment is a glass substrate. In addition, an adhesive layer G2 is provided between the sub-substrates 111 and 112 for bonding the sub-substrates 111 and 112 to each other. In addition, in this embodiment, another conductive structure 16*d* is arranged and penetrates through the sub-substrate 113 and the sub-substrate 112, and another circuit patterned layer 15*h* is arranged between the sub-substrates 112 and 111. For example, the circuit patterned layer 15*h* can be arranged on the lower face of the sub-substrate 112. Therefore, the circuit patterned layer 15*d* can be electrically connected to the circuit patterned layer 15*h* through the conductive structure 16*b*, the circuit patterned layer 15*b*, and the conductive structure 16*d*.

As mentioned above, in the antenna device of this disclosure, the antenna elements are arranged on the first surface of the first substrate, the second substrate is connected to the second surface of the first substrate, and an adhesive can be further provided between the first substrate and the second substrate. Regarding the first substrate and the second substrate, at least the first substrate can further have a multi-substrate structure, and in the multi-substrate structure, multiple sub-substrates can be selectively bonded directly or indirectly. The circuit units are arranged at one side of the second substrate opposite to the first substrate, the circuit patterned layers are arranged on the first substrate and the second substrate, and the conductive structures are connected to at least ones of the circuit patterned layers. In addition, both the first substrate and the second substrate can further include multiple circuit patterned layers. Ones of the circuit patterned layers located on the same substrate can be electrically isolated from each other by the above-mentioned sub-substrate, or electrically isolated from each other by one or more insulation layers. At least two circuit patterned layers are electrically connected by one of the conductive structures, and at least two circuit patterned layers are not adjacent to each other in the stacking direction. The induction units of one circuit patterned layer and multiple antenna elements can transmit a carrier signal to each other by electromagnetic induction. The circuit units and the induction units correspond to each other in a one-to-one or one-to-many relationship, and the circuit patterned layer with the induction units and the corresponding antenna elements are not limited to being adjacent to each other in the stacking direction. Accordingly, this disclosure can constitute a new model of antenna device.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An antenna device, comprising:
- a first substrate defined with a first surface and a second surface opposite to each other;
- a plurality of antenna elements arranged on the first surface of the first substrate;
- a second substrate connected to the second surface of the first substrate;
- a plurality of circuit units arranged at the second substrate;
- a plurality of circuit patterned layers arranged on the first substrate and the second substrate; and
- a plurality of conductive structures connected to at least ones of the circuit patterned layers;
- wherein one of the circuit patterned layers comprises a plurality of induction units corresponding to the antenna elements, at least ones of the circuit units correspond to the induction units, and the induction units and the antenna elements transmit a carrier signal to each other by electromagnetic induction.

2. The antenna device of claim 1, wherein the first substrate is a multi-layer substrate structure.

3. The antenna device of claim 1, wherein the first substrate comprises glass, polytetrafluoroethene, ceramic materials, polyphenylene oxide, or a combination of any of the above materials.

4. The antenna device of claim 1, wherein the second substrate is a single-layer substrate structure.

5. The antenna device of claim 1, wherein the second substrate is made of polyimide or polyphenylene oxide.

6. The antenna device of claim 1, wherein the circuit units arranged at the second substrate comprise a plurality of thin-film transistors, and the thin-film transistors are electrically connected to one of the circuit patterned layers arranged on the second substrate.

7. The antenna device of claim 1, wherein ones of the circuit patterned layers are arranged on the second substrate, and a plurality of insulation layer are arranged between the circuit patterned layers.

8. The antenna device of claim 1, wherein the carrier signal defines a carrier frequency, and the carrier frequency is not less than 10 GHz.

9. The antenna device of claim 1, wherein each of the conductive structures defines a hole and comprises a conductive member arranged in the hole.

10. The antenna device of claim 1, wherein an adhesive layer is provided between the first substrate and the second substrate for adhering the first substrate and the second substrate.

* * * * *